United States Patent [19]

Frantzreb, Sr.

[11] 4,393,298
[45] Jul. 12, 1983

[54] LIQUID COOLING FOR A WELDING TORCH

[75] Inventor: John G. Frantzreb, Sr., Peoria, Ill.

[73] Assignee: Caterpillar Tractor Co., Peoria, Ill.

[21] Appl. No.: 190,132

[22] Filed: Sep. 24, 1980

Related U.S. Application Data

[63] Continuation-in-part of Ser. No. 973,048, Dec. 7, 1978, abandoned.

[51] Int. Cl.³ .............................................. B23K 9/16
[52] U.S. Cl. .......................... 219/137.62; 219/137.42; 219/86.31
[58] Field of Search ...................... 219/137.62, 137.42, 219/137.43, 137.44, 74, 75, 86.31, 61.2, 51, 52

[56] References Cited

U.S. PATENT DOCUMENTS

| | | | |
|---|---|---|---|
| 2,468,807 | 5/1949 | Herbst | 219/75 |
| 2,512,705 | 6/1950 | Anderson | 219/75 |
| 2,870,320 | 1/1959 | Mathews | 219/74 |
| 3,217,133 | 11/1965 | Mattmuller | 219/74 X |
| 3,253,116 | 5/1966 | Kensrue | 219/137.62 |
| 3,529,126 | 9/1970 | Reeh | 219/137.62 |
| 3,689,733 | 9/1972 | Matasovic | 219/137.62 |
| 3,803,381 | 4/1974 | Bernard et al. | 219/137.42 |
| 4,024,374 | 5/1977 | Cloos | 219/137.44 |
| 4,158,763 | 6/1979 | Moerke | 219/137.42 |

FOREIGN PATENT DOCUMENTS 603525  4/1978  U.S.S.R. ................... 219/75

OTHER PUBLICATIONS

*Automatic Welding*, No. 2, 1975, pp. 63-64, "A New System for Supplying Welding Stations with Liquefied Carbon Dioxide", by Bondarev.
*Instructions for ST-12 MIG Welding Torch*, Form 11-48-8-C, Sep. 1977, Union Carbide Welding Products.

*Primary Examiner*—B. A. Reynolds
*Assistant Examiner*—Philip H. Leung
*Attorney, Agent, or Firm*—William B. Heming

[57] ABSTRACT

During operation of a welding torch (10), electrode wire (17) travels through a contact tip assembly (14) directly into a weld area. The torch (10) is exposed to elevated temperatures which can cause damage from weld spatter and increased deterioration of the assembly (14). In the welding torch (10), a liquid is delivered onto an expansion element (44) and gasifies owing primarily to the elevated welding temperatures at the expansion element (44). The result is to cool the assembly (14) and substantially overcome the problems of temperature. In a nozzle (18) equipped torch (10), the nozzle (18) directs a portion of the gasified liquid to the welding area for shielding the welding operation.

7 Claims, 8 Drawing Figures

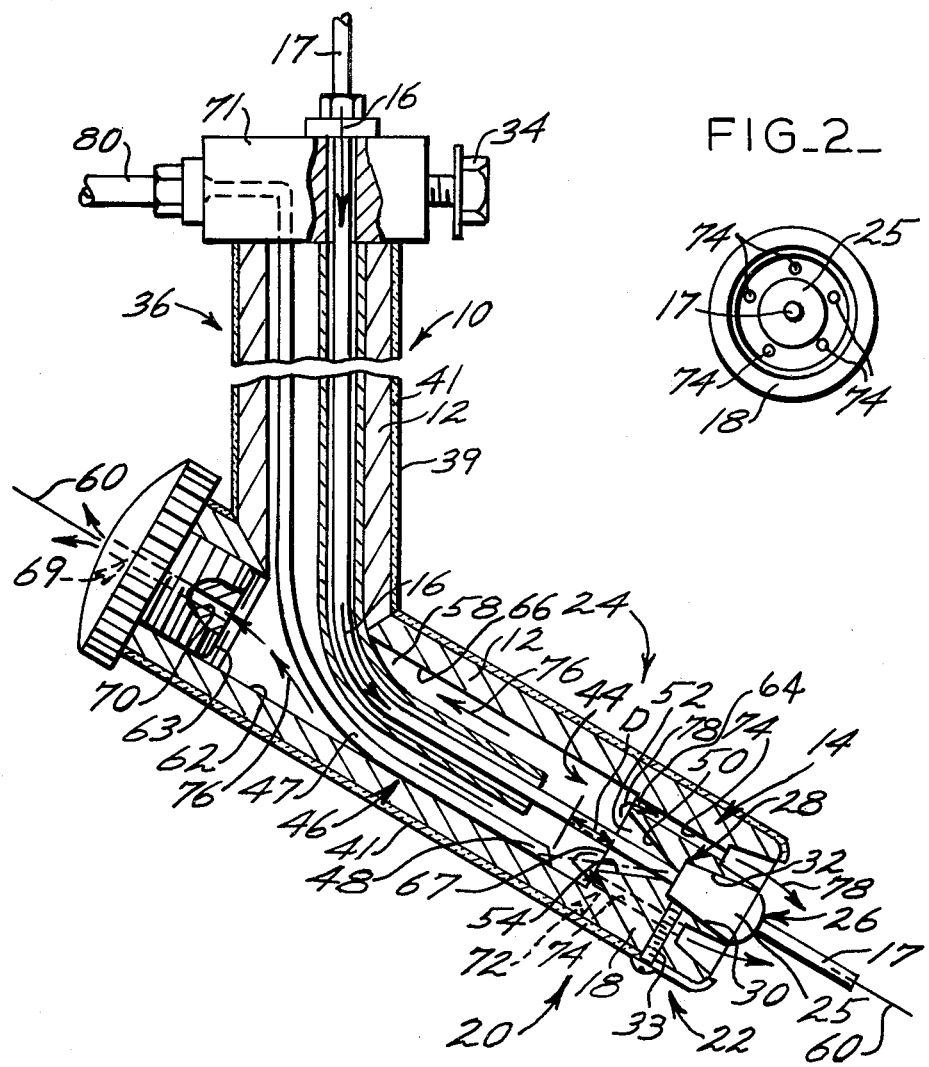
FIG_1_
FIG_2_

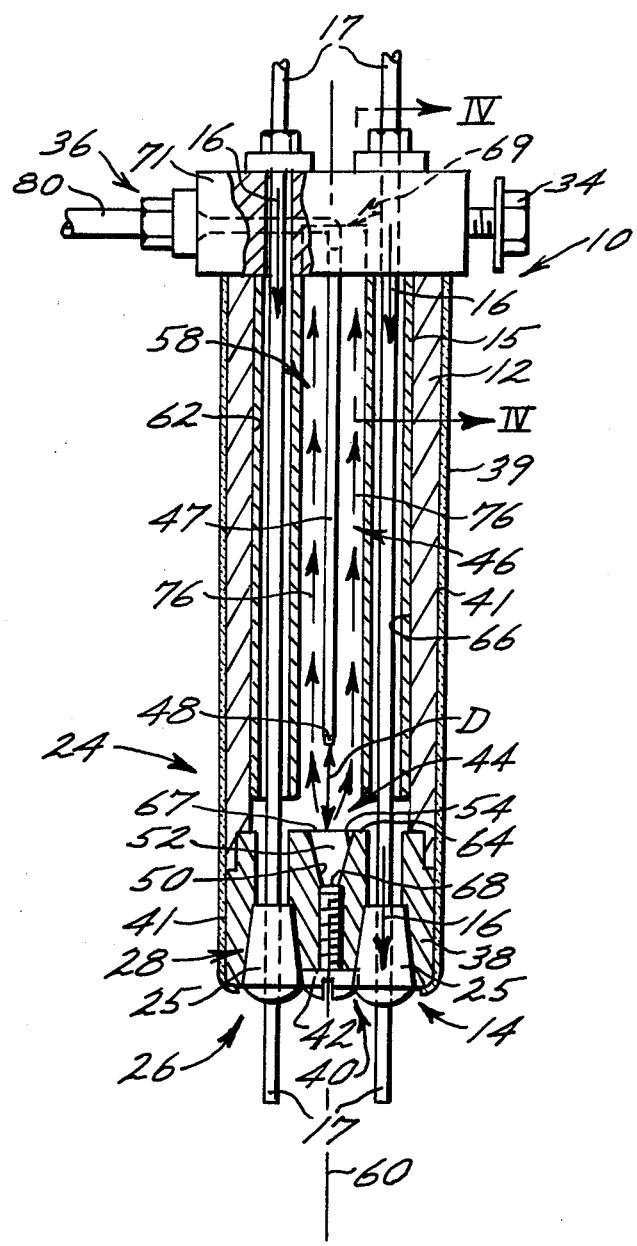
FIG_3

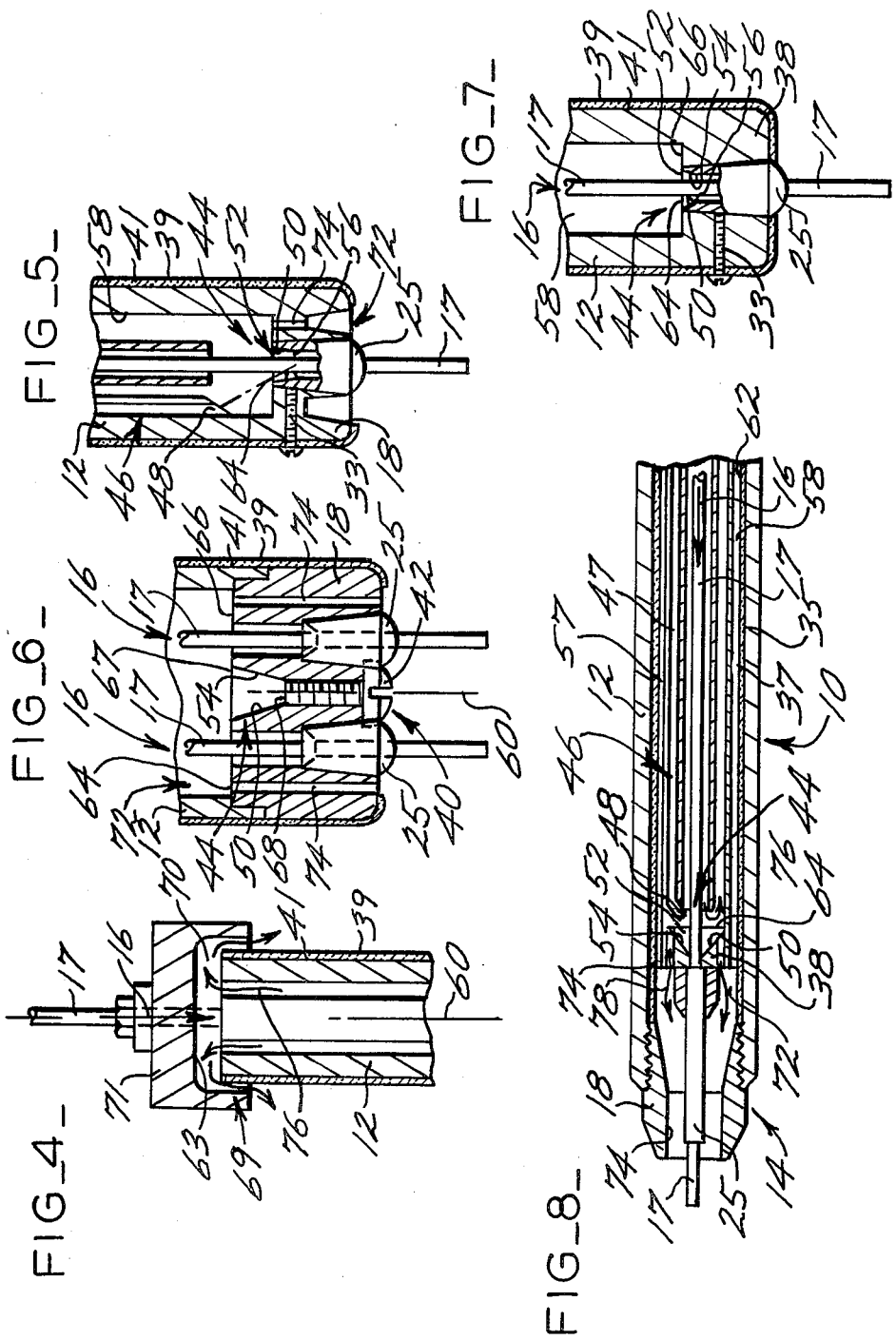

LIQUID COOLING FOR A WELDING TORCH

CROSS REFERENCE TO RELATED APPLICATIONS

This application is a continuation-in-part of application Ser. No. 973,048 filed by John G. Frantzreb, Sr. on Dec. 7, 1978, now abandoned.

TECHNICAL FIELD

The invention relates to welding torches. More particularly, the invention relates to cooling the welding torches.

BACKGROUND ART

In the use of a welding torch, it is desirable to cool the torch as much as possible in order to substantially prevent damage to said torch from the elevated temperatures of the welding operation and from weld spatter.

For example, in arc welding operations involving the use of gas for shielding the arc area of the weld, a conventional welding torch typically has a nozzle and a contact tip. During welding, wire passes through and is supported by the contact tip which is positioned directly adjacent the weld area. The nozzle directs gas supplied to the torch, such as carbon dioxide gas, into the weld area for shielding purposes. The gas is generally supplied from a supply tank through hoses to the torch or, alternately, can also be supplied in liquid form to a location upstream of the torch where it is gasified before entering the torch.

In the torch, the nozzle is connected to a body of the torch and the contact tip is connected to a central guide housing. Both the contact tip and guide housing are positioned inside the torch body and are insulated from the nozzle and torch body. Electrical current is passed through the central guide housing and contact tip to the electrode wire to provide the electrical potential between the wire and work piece necessary in arc welding operations.

The contact tip and nozzle, positioned immediately adjacent the weld area, are directly exposed to the elevated temperatures of welding. During such operations, it is desirable to cool both the nozzle and the contact tip to prevent "burn through" owing to the high welding temperatures and to prevent build-up of weld spatter both of which can result in frequent replacement of the nozzle or contact tip and interference with gas flow to the arc area.

Heretofore, the contact tip has been cooled typically by liquid, generally water, circulated through the guide housing and adjacent the contact tip. The nozzle is air cooled except for indirect cooling effects from the guide body through the insulated area between the nozzle and guide body. Such welding torch construction is disclosed in U.S. Pat. Nos. 3,689,733 which issued to Matarovic on Sept. 5, 1972, and 3,529,126 which issued to Reeh on Sept. 15, 1970. Matarovic also uses the shielding gas supplied to the torch to cool the outer or handle portion of the torch by directing the flow of gas through a portion of the torch associated with the handle. U.S. Pat. No. 3,253,116 which issued to Kensrue on May 24, 1966, alternately discloses the use of air for cooling a welding torch.

Another type of welding involving problems of elevated temperature is that which does not require gas for shielding purposes, such as in electro-slag welding. The typical welding torch does not, therefore, generally make use of a nozzle. The contact tip is connected directly to the body through a mounting assembly and the electrical current passes through the body and contact tip to the wire. Cooling of the contact tip and the mounting assembly is also important to prevent damage to the welding torch owing to problems similar to those discussed above which are associated with the high temperatures created in the welding process.

The cooling of the above described welding torches, particularly in a heavy duty cycle of automated or robot welding, is sometimes not adequate. It is therefore desirable to provide apparatus to more directly cool the contact tip and the associated mounting element or nozzle, where present.

It will be appreciated that the use of liquids, which absorb heat during gasification, in direct association with the nozzle or contact tip can provide cooling of said elements during the gasification process.

U.S. Pat. No. 2,870,320 which issued to Matthews on Jan. 20, 1959, discloses the principle of gasifying liquid to cool a welding torch. Also, liquid used to create the plasma for a plasma torch is shown being utilized to provide some cooling to the plasma torch in U.S. Pat. No. 3,217,133 which issued on Nov. 9, 1965, to Matmuller.

Such use of liquids is particularly true with such liquids as carbon dioxide which absorb a relatively high amount of heat energy during gasification. Thus, preferably, liquid can be supplied into the welding torch and directly onto the nozzle, contact tip or elements closely associated thereto for gasification owing to the elevated temperatures of welding at said components of the torch. Use of liquids, however, is not without problems. For example, the use of carbon dioxide, or similarly acting coolants which exhibit instability in their liquid phase, can result in some solid material or "snow" being created which can block the torch and prevent continuous operation.

The present invention is directed to overcoming one or more of the above-described problems.

DISCLOSURE OF INVENTION

In one aspect of the present invention, a welding torch has a body with a contact tip assembly. An expansion element is provided for receiving a flow of liquid and initiating a flow of gas in response to gasification of the liquid at the expansion element which is defined by a surface adjacent a central chamber of the torch. Means which includes a delivery orifice is provided for delivering liquid to said expansion element. Vent means is also provided to controllably maintain a preselected flow of gas from the central chamber to a location spaced from the contact tip assembly.

During welding operations, the contact tip assembly, and a nozzle, if present for gas shielded welding, are exposed to the elevated temperature of welding which can cause adherence of weld spatter and increased deterioration of the welding torch. Gasification of the liquid at the expansion element acts to cool the contact tip assembly and substantially overcome the above-mentioned problems. Where present, the nozzle directs some of the gasified liquid toward the weld area to shield the welding operation.

BRIEF DESCRIPTION OF THE DRAWINGS

FIG. 1 is a diagrammatic cross-sectional view showing one embodiment of the present invention;

FIG. 2 is a diagrammatic end view of FIG. 1;

FIG. 3 is a diagrammatic cross-sectional view showing another embodiment of the present invention;

FIG. 4 is a diagrammatic cross-sectional view taken along lines IV—IV of FIG. 3;

FIG. 5 is a partial diagrammatic cross-sectional view showing yet another embodiment of the present invention;

FIG. 6 is a partial diagrammatic cross-sectional view showing still another embodiment of the present invention;

FIG. 7 is a partial diagrammatic cross-sectional view showing still yet another embodiment of the present invention; and FIG. 8 is a partial diagrammatic cross-sectional view showing yet one more embodiment of the present invention.

BEST MODE FOR CARRYING OUT THE INVENTION

Referring to the drawings, a welding torch 10 has a body 12, having a contact tip assembly 14. An electrode pathway 16 passes through the body 12 including the contact tip assembly 14. The contact tip assembly 14 supports electrode wire 17, which passes through the electrode pathway 16 during welding operations as is known in the art. A wall 15 defines one portion of the electrode pathway 16 and includes a replaceable liner and a conduit guide as is also known in the welding art. Each of the separate embodiments shown in the drawings is hereinafter more fully discussed with respect to the particular construction and operation of said embodiments.

Referring to the embodiment of FIG. 1, the body 12 has a nozzle 18 having first and second end portions 20,22. The nozzle 18 is positioned at a first end portion 24 of the body 12. The contact tip assembly 14 includes a contact tip 25 having first and second end portions 26,28. The electrode pathway 16 passes through the contact tip 25 and opens on the first end portion 26 of said contact tip 25 adjacent the second end portion 22 of the nozzle 18. Such a welding torch 10 is intended principally for use in gas shielded arc welding applications owing to the use of a nozzle which, by definition, includes that portion of a welding torch directing gas for shielding purposes to the arc area of a weld during use of the torch. The nozzle 18 of FIG. 1, for example, is of unitary construction with the body 12. Said nozzle 18 can also be removable or welded to the body 12 similar to FIG. 3.

The contact tip 25 of the welding torch 10 of FIG. 1 is positioned in direct contact with the nozzle 18 such that there is no substantial barrier, such as an electrical or heat insulating material or air gap, for example, between the nozzle 18 and contact tip 25 which can interfere with the transfer of heat between said nozzle 18 and contact tip 25. The nozzle 18 has an opening 30 having a surface 32. The second end portion 28 of the contact tip 25 is positioned in the opening 30 and in contact with the surface 32 of said opening 30. The nozzle opening 30 and second end portion 28 of the contact tip 25 preferably have mateable tapering configurations as shown. A set screw 33 of the contact tip assembly 14 removably maintains the contact tip 25 in position.

Further, the welding torch 10 includes a current pathway passing from an input lead connecting bolt 34 at a second end portion 36 of body 12, through said body 12, and to the nozzle 18 and the contact tip 25 for providing electrical potential across the electrode wire 17 and a work piece (not shown) during welding operations. The tapering surface to surface contact of the nozzle 18 and contact tip 25 provides a positive current pathway through the welding torch 10.

The embodiment of FIG. 8 shows another aspect of the present invention with respect to welding torches of the gas shielding type and is similar in construction to FIG. 1. However, the nozzle 18 is electrically insulated by a liner 35 and an air gap 37 from the electrode pathway 16 and contact tip assembly 14 similar to more conventional torch construction. The electrical insulation also establishes a heat transfer barrier between the nozzle 18 and contact tip 25.

Referring to the embodiment of FIG. 3, the welding torch 10 is of the type intended principally for welding which does not require a gas shield, such as welding of the electro-slag type. Said embodiment can also be used for arc welding without gas shielding. The contact tip assembly 14 includes the contact tip 25 as previously discussed and a mounting element 38. The contact tip 25 is connected to or a part of the body 12 by being mounted on the mounting element 38. A current pathway through the torch 10 is thus established through the mounting element 38 and contact tip 25 similar to the torch 10 of FIG. 1. A connecting element 40, shown as, for example, a bolt 42 is positioned in engagement with the contact tip 25 to maintain it in position in the mounting element 38 similar to FIG. 1. As shown, FIG. 3 includes a pair of contact tips 25 and associated elements. Also, an insulating element 39, such as a ceramic coating, is positioned on an outer surface 41 of the welding torches 10 described herein, except for FIG. 8, in order to electrically isolate the torches 10 and prevent a short circuit between the torch 10 and a work piece (not shown). Handles or similar apparatus can be added for manually operated torches.

In each of the welding torches 10, an expansion element 44 is provided for receiving a flow of liquid and controllably initiating a flow of gas to a preselected location relative to the contact tip assembly 14 in response to gasification of said liquid at said expansion element 44. Liquid delivery means 46, such as a tube 47 and delivery orifice 48, is provided for controllably delivering a preselected amount of liquid to the expansion element 44.

More particularly, the expansion element 44 is defined by a surface 50 which, in turn, defines an aperture 52 having sidewalls 54 and, in some embodiments (FIGS. 5 and 7), a bottom wall 56. The aperture 52 opens into or onto a central chamber 58 situated in the body 12 and positioned about a central axis 60, such as the axis of symmetry, of the body 12. The central chamber 58 is defined by walls 62,63,64 of the body 12 and has a periphery 66. Preferably, the walls include circumferential walls 62 and first and second end walls 63,64 adjacent respective second and first end portions 36,24 of the body 12 and and extending between the circumferential walls 62. The aperture 52 opens into the second end wall 64 into communication with the central chamber 58 at a location immediately adjacent the contact tip assembly 14.

As shown, the central chamber 58 is cylindrical and is symmetrically positioned about the axis of symmetry 60 of the body 12. The aperture 52 is frustoconical with its base 67 at the periphery 66 of the central chamber 58 where it opens onto the second end wall 64. Further, the opening of the aperture 52, or base 67, at the second end wall 64 has a cross-sectional area less than that of said end wall 64. The central chamber 58 and aperture 52 can also be of other configurations. For example, the aperture can be hemispherical, a shape which would also provide relatively high surface area at the expansion element.

In torches 10 used for gas shielded welding, the expansion element 44, and thus the aperture 52, is positioned in one of the nozzle 18 and contact tip 25. In embodiments similar to FIG. 3, the aperture 52, and thus the surface 50 defining the expansion element 44, is positioned on one of the contact tip 25 and mounting element 38 as shown in FIGS. 7 and 3, respectively. In FIG. 8, the mounting element 38 has the surface 50 and connects the contact tip 25 to a central insulated conduit 57.

The electrode pathway 16 can pass through the expansion element 44 as shown in some of the embodiments. In such instances, it will typically coincide with the central axis 60 of the body 12. When the electrode pathway 16 does not pass through the expansion element 44, it is preferable to provide external access to the expansion element 44 for cleaning purposes. Thus, as seen in FIG. 3, for example, the connecting element 40 is removably connected to the mounting element 38. The surface 50 defining the expansion element 44 then includes a surface 68 of the connecting element 40. The welding torch 10 of the type shown in FIG. 1 can also be similarly constructed by removably connecting the connecting element 40 to the nozzle 18 (FIG 6.).

Referring now to the liquid delivery means 46, the tube 47 is preferably of a capillary type. The delivery orifice 48 is connected to or positioned on said tube 47 in the central chamber 58 and spaced a preselected distance D from the periphery 66 of the central chamber 58 at the opening of the aperture 52 onto the second end wall 64. The distance D is determined by the capability of the system to deliver the liquid as desired to a preselected position at and onto said expansion element 44. The preselected position is preferably located centrally on the surface 50 defining the expansion element 44 such as, for example, the surface of the connecting element (FIG. 3).

The welding torch 10 also includes vent means 69 for controllably maintaining a preselected flow of gas from said central chamber 58 to a location spaced from the contact tip assembly 14. For example, the second end portion 36 of the body 12 has an opening 70 having a preselected configuration which serves to vent the central chamber 58. One embodiment of the opening 70, shown in detail in FIG. 4, is positioned in a head element 71 of the body 12. The opening 70 can also be of other configurations and orientations such as shown in FIG. 1.

In welding torches of the gas shielding type, such as in FIG. 1, a gas flow pathway 72 is positioned in fluid communication with the expansion element 44 and with the first end portion 26 of the contact tip 25. In the preferred embodiment, said gas flow pathway 72 includes a passageway 74 through the nozzle 18 and opening into the central chamber 58 and externally of the welding torch 10 adjacent the contact tip 25. The nozzle 18 preferably has a plurality of passageways 74 as is best seen in FIG. 2, for example, to assure a flow of gas to surround the first end portion 26 of the contact tip 25. It should be understood that the gas flow pathways 72 can also be of other configurations and orientations, such as conduits externally fixed to the welding torch 10, without departing from the invention.

INDUSTRIAL APPLICABILITY

In the use of the welding torch 10, liquid under pressure passes through the orifice 48 onto the expansion element 44 and gasifies owing primarily to the elevated temperature during welding of the surface 50 defining the expansion element 44. The gasification results in cooling of the torch 10 and, in the case of a nozzle equipped torch 10, some gas is directed to the first end portion 26 of the contact tip for shielding purposes.

For example, operation of the welding torches described subjects the contact tip 25 and the nozzle 18 or mounting element 38 to extremely high temperatures owing to their close proximity to the weld location. Liquid is supplied in a hose 80 at the head element 71 and to the tube 47 for delivery to the orifice 48. The orifice 48 directs the liquid preferably in a steady stream onto the surface 50 defining the expansion element 44. The elevated temperature of the surface 50 tends to gasify the liquid upon contact. The resultant gasification provides uniform axial cooling of a torch 10 and, in particular, cools the contact tip 25 and nozzle 18 or mounting element 38 substantially preventing build-up of weld spatter and deterioration at the high temperatures. The nozzle 18 or mounting element 38 are preferably constructed of a highly conductive material, such as copper, to promote heat transfer for maximum cooling. The contact tip 14, however, is preferably of a material of high temperature hardness, such as tungsten carbide, to resist wear resulting from the passing of the electrode wire 17 therethrough.

The expansion element 44 controllably maintains a flow of the gasified liquid generally upward from the contact tip 25 as a result of the liquid dropping onto the expansion element 44 and the sudden gasification at elevated temperatures. The gasified liquid or gas tends to pass through the central chamber 58 and vent opening 70 to the atmosphere (shown by flow lines 76 in FIGS. 1, 3 and 4). The configuration of the expansion element 44 also tends to promote gasification and the flow of gas by increasing surface area and controlling the gasification process. It is the inventor's opinion that as liquid is spilled centrally into the expansion element 44 as disclosed liquid and gasified portions of the liquid will move outwardly from the stream of liquid and upwardly adjacent the sidewalls 54 of the aperture 52 toward the central chamber 58.

Where gas shielding is desired, a back pressure of gas is created by the size or configuration of the vent opening 70 in order to induce a flow of gas through the passageways 74 in the nozzle 18 and toward the first end portion 26 of the contact tip 25. Said gas flow is shown by flow lines 78 in FIGS. 1 and 8. In other words, gas is metered from the central chamber 58 and to the atmosphere in order to establish sufficient back pressure in the chamber 58 to encourage flow through the nozzle passageways 74. The size of the passageways 74 also determine the amount of shielding gas available. Gas also tends to flow in the electrode pathway 16 adjacent the electrode wire 17 owing to the back pressure or to the action of the moving wire 17. This provides some blocking of air or contaminates entering into the welding torch 10 for more efficient torch operation. It will be readily apparent that the preselected amount of liquid delivered by the tube 47 through the orifice 48 will depend upon the amount of cooling necessary and the magnitude of the back pressure which limits the flow of the gas.

In the case of some types of liquids, such as carbon dioxide, for example, which is a preferred coolant, the instability of the liquid phase also tends to promote gasification. Further, the "air gap" represented roughly by the volume of the central chamber 58 between its periphery 66 at the aperture 52 and the orifice 48, i.e through the distance D, represents a greater volume of expansion in addition to the relatively lesser volume of the aperture 52. The relatively large area of the surface 50 easily facilitates gasification in the aperture 52. However, in torches requiring high refrigerant capacity or with the tendency to quick and high volumetric expansion of such coolants as carbon dioxide, the "air gap" of the central chamber is important to prevent solidified coolant or "snow" from forming in the otherwise relatively small volume of the aperture 52. If the orifice 48 were located in or at said aperture 52 or its opening into the central chamber 58, and particularly if the "air gap" was absent, "snow" forming might easily plug the orifice 48 or interfere with torch operations.

As will be understood from a study of drawings, the constructions of the embodiments disclosed are generally applicable one to the other. The embodiment of FIG. 3 can also be adapted to welding of the gas shielding type by removing one of the contact tips 25 or the electrode wire 17 to provide a passageway through the mounting element 38. It should also be appreciated that the embodiment of FIG. 8 will not make significant use of the cooling effect on the nozzle 18 owing to the isolation of the nozzle 18 from contact tip assembly 14. However, annular cooling passages in the torch 10, such as for water, are eliminated in some such embodiments owing to dual use of the liquid and delivery of the liquid directly onto the nozzle 18 and contact tip 25 area of the torch 10 for cooling purposes.

Other aspects, objects and advantages will become apparent from a study of the specification, drawings and appended claims.

I claim:

1. In a welding torch (10) having a body (12) and an electrode pathway (16), said body (12) having a contact tip assembly (14) and first and second end portions (24,36), said contact tip assembly (14) being positioned at said first end portion (24) of said body (12), said electrode pathway (16) passing through said contact tip assembly (14), the improvement comprising:
   said body (12) having a central axis (60) and walls (62,63,64) defining a central chamber (58), said central chamber (58) having a periphery (66) and being symmetrical about said central axis (60);
   an expansion element (44) defined by a surface (50) and positioned for receiving a flow of liquid and controllably initiating a flow of gas in said central chamber (58) in response to gasification of said liquid at said expansion element (44), said surface (50) defining an aperture (52) symmetrical about said central axis (60) and through which said central axis (60) passes and opening through a wall (64) of said body (12) into said central chamber (58) immediately adjacent said contact tip assembly (14);
   vent means (69) for controllably maintaining a preselected flow of gas from said central chamber (58) to a location spaced from said first end portion (24) of said body (12); and
   means (46) for controllably delivering a preselected amount of liquid onto said expansion element (44), said means (46) including a delivery orifice (48) positioned in said central chamber (58) and spaced a preselected distance (D) from said periphery (66) of said central chamber (58) at the opening of said aperture (52) onto said wall (64) and oriented for directing said delivered liquid through said central chamber (58) into said aperture (52) to a preselected location on said expansion element (44).

2. The welding torch (10), as set forth in claim 1, wherein said electrode pathway (16) is along said central axis (60) of said body (12).

3. The welding torch (10), as set forth in claim 1, wherein said contact tip assembly (14) includes a contact tip (25) and said aperture (52) is positioned in said contact tip (25).

4. The welding torch (10), as set forth in claim 1, wherein said liquid is directed onto said expansion element (44) at the location at which said central axis (60) passes through said expansion element (44).

5. The welding torch (10), as set forth in claim 1, including a gas flow pathway (72) positioned in fluid communication with said expansion element (44) and said contact tip (25).

6. The welding torch (10), as set forth in claim 5, including a nozzle (18) positioned at said end portion (24) of said body (12) and wherein said gas flow pathway (72) includes a passageway (74) through said nozzle (18) and positioned in communication with said central chamber (58).

7. In a welding torch (10) having a body (12) and an electrode pathway (16), said body (12) having first and second end portions (24,36) and including a contact tip assembly (14) and a nozzle (18), said nozzle (18) having first and second end portions (20,22) and being positioned at said first end portion (24) of said body (12), said contact tip assembly (14) being mounted on said second end portion (22) of said nozzle (18), said electrode pathway (16) passing through said nozzle (18) and said contact tip assembly (14), the improvement comprising:
   said body (12) having a central axis (60), circumferential walls (62), and first and second end walls (63,64), said walls (62,63,64) defining a central chamber (58), said central chamber (58) having a periphery (66), said circumferential walls (62) being positioned along and about said central axis (60), said end walls (63,64) extending between said circumferential walls (62);
   an expansion element (44) defined by a surface (50) and positioned for receiving a flow of liquid and controllably initiating a flow of gas in said central chamber (58) in response to gasification of said liquid at said expansion element (44), said surface (50) defining an aperture (52) positioned in one of said nozzle (18) and said contact tip assembly (14) and opening onto said second end wall (64) into communication with said central chamber (58);
   vent means (69) for controllably maintaining a preselected flow of gas from said central chamber (58) at said second end portion (36) of said body (12);
   means (46) for controllably delivering a preselected amount of liquid onto said expansion element (44), said means (46) including a delivery orifice (48) positioned in said central chamber (58), oriented for directing said delivered fluid to a preselected location on said expansion element (44) and spaced a preselected distance (D) from said periphery (66) of said central chamber (58) at the opening of said aperture (52) onto said second end wall (64); and
a gas flow pathway (72) positioned in said nozzle (18) and opening onto said second end wall (64) in communication with said central chamber (58) and opening externally of said welding torch (10) adjacent said contact tip assembly (14).

* * * * *